Patented Feb. 22, 1944

2,342,142

UNITED STATES PATENT OFFICE 2,342,142

ESTERS OF SULPHUR-CONTAINING BENZO-IC ACIDS AND PROCESS OF PREPARING THEM

Sidney E. Harris, Coral Gables, Fla., and William Braker, Brooklyn, N. Y., assignors to E. R. Squibb & Sons, New York, N. Y., a corporation of New York No Drawing. Application September 9, 1937, Serial No. 163,035

9 Claims. (Cl. 260—470)

This invention relates to, and has for its object the provision of, certain esters of sulphur-containing benzoic acids, intermediates used in their preparation, and methods of preparing them. These esters have the general formula

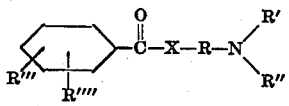

wherein X represents O or S, R represents an alkylene radical, R' and R'' represent alkyl radicals, R''' represents an alkoxy, aralkoxy, alkylmercapto or aralkylmercapto radical, and R'''' represents H or NH₂, the compound containing at least one —S— linkage.

The compounds of this invention are valuable therapeutic agents, being particularly effective for inducing local anesthesia.

In the practice of this invention, an aracyl halide of the general formula

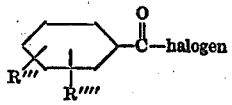

wherein R''' and R'''' have the above-designated meaning, is reacted with an alcohol of the general formula

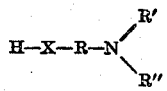

wherein X, R, R', and R'' have the above-designated meaning; alternatively, the aracyl halide is reacted with an alcohol of the formula H—X—R—halogen where X and R have the above-designated meaning; and the reaction product is treated with a dialkyl amine.

The amino-esters of this invention are generally recovered in the form of their addition-salts with hydrochloric acid. However, other acids forming addition salts with amines may be used in place of hydrochloric acid; such as boric, nitric, lactic, tartaric, citric, phosphoric, sulphuric, picric, and picrolonic. The addition-salts may be converted into the free bases in the usual manner.

The following examples are illustrative of the invention.

EXAMPLE 1

β-Diethylamino-ethyl ester of p-ethoxy-thiol-benzoic acid

Refluxing a benzene solution of 1 mol of β-brom-ethyl thiol and 1 mol of p-ethoxy-benzoyl chloride for several hours, distilling off the benzene under reduced pressure, and recrystallizing the residue from petroleum ether, decolorizing if necessary, yields the intermediate compound, β-brom-ethyl thiol p-ethoxy-benzoate, having a melting point of 77–79° C. Then, refluxing 1 mol of this benzoate with slightly more than 2 mols of diethylamine in benzene solution for about 7 hours causes diethylamine hydrobromide to precipitate out; filtering off this deposit, washing it with benzene, evaporating the filtrate and washings under reduced pressure and adding thereto an absolute alcoholic solution containing 1 equivalent of hydrogen chloride, yields, upon diluting with an excess of dry ether, the hydrochloride of the desired ester as a white crystalline precipitate melting at 129–132.5° C.

The bromo-ester intermediately formed need not be isolated. The benzene solution obtained by refluxing a mixture of one mole of the benzoyl chloride and one mole of the thiol can be directly treated with diethylamine.

EXAMPLE 2

β-Diethylamino-ethyl esters of p-alkoxy-thiol-benzoic acid

In a manner similar to that described in Example 1, but using p-n-propoxy-benzoyl chloride and p-n-butoxy-benzoyl chloride, one obtains, respectively, the p-n-propoxy-thiol-benzoate, melting at 133–134° C., and the p-n-butoxy-thiol-benzoate, melting at 142–143° C.

EXAMPLE 3

β-Diethylamino-ethyl ester of p-ethylmercapto-thiol-benzoic acid

The hydrochloride of this compound may be prepared in the manner described in Example 1 by using p-ethylmercapto-benzoyl chloride in place of p-ethoxy-benzoyl chloride.

Example 4

*β-Diethylamino-ethyl esters of p-alkylmercapto-thiol-benzoic acid*

In a manner similar to that described in Example 1, using p-n-propylmercapto-benzoyl chloride and p-n-butylmercapto-benzoyl chloride, one obtains respectively the p-n-propylmercapto-thiol-benzoate and the p-n-butylmercapto-thiol-benzoate.

Example 5

*β-Diethylamino-ethyl ester of p-ethylmercapto-benzoic acid*

Reducing p-chlorosulphonyl benzoic acid with zinc dust and hydrogen chloride in a glacial acetic acid solution forms a deposit of p-sulphhydryl-benzoic acid. After filtering off the precipitate and dissolving the filter cake in an excess of dilute (10%) solution sodium hydroxide, the solution is stirred while 2.5 equivalents of diethyl sulphate are added thereto, after which the reaction is allowed to proceed, with constant stirring, at room temperature for 1 hour. Then 60 g. of a 36% solution of sodium hydroxide is added, the mixture is boiled, and after cooling, the solution is filtered, the free acid is precipitated with dilute hydrochloric acid, and after filtering the precipitate, washing, drying and reprecipitating it from benzene, the p-ethyl-mercapto-benzoic acid intermediate is obtained in the form of colorless plates having a melting point of 147–148° C. Warming 20 g. of this benzoic acid derivative and 23 g. of phosphorus pentachloride until hydrogen chloride ceases to be evolved, distilling off the phosphorus oxychloride under reduced pressure and vacuum-distilling the residue, yields p-ethylmercapto-benzoyl chloride, boiling at 137–143° C./4 mm. 4.5 g. of this intermediate and 2.6 g. of diethylamino-ethyl alcohol are dissolved in 10 to 15 cc. of chloroform, and the mixture warmed for 15 minutes; then, after adding dry ether thereto, the hydrochloride of the desired compound separates out as a white crystalline substance melting at 167–168° C. The free base, when separated from its hydrochloride, distills at 210–215° C./3 mm. with slight decomposition; upon cooling, it crystallizes and may be subsequently melted at 155° C.

Example 6

*β-Diethylamino-ethyl ester of p-n-butylmercapto-benzoic acid*

67 g. of 4-chlorosulphonyl benzoic acid is dissolved in 650 cc. glacial acetic acid, and heated on a steam bath while stirring and adding 450 cc. concentrated hydrochloric acid and 143 g. zinc duct simultaneously in small portions. When the zinc has dissolved, 3000 cc. of cold water is added, and the precipitate formed is filtered off and washed with water. The precipitate is suspended in 100 cc. water and dissolved by adding the calculated quantity of sodium bicarbonate. This solution is mixed with 500 cc. water, 32 g. sodium hydroxide, and 65 g. n-butyl bromide, and the whole stirred for 2½ hours; it is then poured into an excess of cold dilute hydrochloric acid. The white precipitate formed is filtered off, washed with water, and dried at 75° C. The product, melting at 118.5–120.5° C. (corrected) is p-n-butylmercapto-benzoic acid.

15 g. of this acid and 15 g. phosphorus pentachloride are mixed together, and when the initial reaction ceases, the mixture is fractionally distilled. The fraction boiling at 160–165° C. at 5 mm. pressure is p-n-butylmercapto-benzoyl chloride. This compound, when reacted with β-diethylamino-ethyl alcohol in the manner indicated in Example 1, yields the β-diethylamino-ethyl ester of p-n-butylmercapto-benzoic acid having a melting point of 120–125° C.

Example 7

*β-Diethylamino-ethyl ester of 3-amino-4-n-butoxy-thiol-benzoic acid*

After dissolving 38 g. of β-diethylamino-ethyl alcohol in 100 cc. of dry benzene, the solution is added at a slow drip to a stirred solution comprising 39 g. of thionyl chloride dissolved in 50 cc. of dry benzene. After refluxing the mixture on a steam bath, with stirring, for 30 to 60 minutes, it is cooled; the hydrochloride of β-diethylamino-ethyl chloride separating out is filtered off and washed with benzene. Dissolving this hydrochloride with 13 g. of sodium hydroxide in 25 cc. of water, causes the free base to be suspended therein. Then the resulting suspension is slowly added, with stirring, to a solution of sodium hydrosulphide (previously prepared by saturating with hydrogen sulphide a solution comprising 26 g. of sodium hydroxide dissolved in 42 cc. of water). This reaction mixture is heated to 70–75° C. for 90 minutes, cooled, and the β-diethylamino-ethyl thiol extracted with ether; drying the ether solution with sodium sulphate, evaporating off the ether, and distilling the residue, yields the desired intermediate, β-diethylamino-ethyl thiol, having a boiling point of 160–170° C. Its hydrochloride is a white crystalline solid melting at 205° C., with decomposition. Dissolving 1.9 g. of β-diethylamino-ethyl thiol and 1 g. of 3-nitro-4-n-butoxy-benzoyl chloride in chloroform, refluxing the mixture for 30 minutes, precipitating the hydrochloride formed by adding dry ether, and filtering and drying the filter cake in vacuo, yields β-diethylamino-ethyl ester of 3-nitro-4-n-butoxy-thiol-benzoic acid, having a melting point of 100–105° C. This nitro-ester is reduced by slowly adding, with stirring, 1 g. of this ester and 20 cc. of concentrated hydrochloric acid and 75 cc. of alcohol. The mixture is stirred for 6 hours after the iron has been added; then, after filtering off the iron, and neutralizing the filtrate with sodium carbonate, the precipitate formed is extracted with ether; washing this ether solution with water and subsequently drying it with sodium carbonate and adding an absolute alcohol solution of hydrogen chloride thereto causes the hydrochloride of the desired product to precipitate out as a yellow crystalline powder melting at 123–125° C.

Alternatively, the β-diethylamino-ethyl ester of 3-nitro-4-n-butoxy-thiol-benzoic acid is prepared by refluxing 13.3 g. of the nitro acid chloride, 6.6 g. β-diethylamino-ethyl thiol, and 20.4 g. anhydrous potassium carbonate in benzene solution for 7 hours, filtering and distilling off the benzene. The residual oil may be reduced directly.

Example 8

*β-Diethylamino-ethyl esters of 3-amino-4-n-alkoxy-thiol benzoic acid*

In a manner similar to that described in Example 7, but using 3-nitro-4-n-propoxy-benzoyl chloride, one obtains the β-diethylamino-ethyl ester of 3-amino-4-n-propoxy-thiol benzoic acid.

Example 9, following, relates to the production of an intermediate β-diamylamino-ethyl thiol which may be used in place of the β-diethylamino-ethyl thiol of the foregoing examples, to produce, for example, the β-diamylaminoethyl ester of p-propyl-mercapto-thiol-benzoic acid.

EXAMPLE 9

β-Diamylamino-ethyl thiol 60 g. diamylamine is dissolved in 100 cc. benzene and 25 g. β-bromo-ethylmercaptan added. The mixture is refluxed until no more diamylamine hydrobromide separates, cooled, and mixed with 500 cc. water. The benzene layer formed is separated and extracted with dilute hydrochloric acid; the extract is alkalinized with sodium hydroxide, and the precipitated oil extracted with ether. The extract is dried, the ether distilled off, and the residue fractionated in vacuo. The fraction boiling at 123-124° at 10 mm. pressure is β-diamylamino-ethyl thiol.

The invention may be variously otherwise embodied, within the scope of the appended claims.

We claim:

1. The β-diethylamino-ethyl ester of p-ethyl-mercapto benzoic acid.

2. The process which comprises etherifying p-sulphhydryl-benzoic acid, converting the acid into the corresponding acid halide, and esterifying the latter with a dialkylamino-alkanol.

3. In the process of preparing dialkylamino-alkyl esters of p-alkylmercapto-benzoic acids, the steps of reducing p-chloro-sulphonyl-benzoic acid to p-thiol benzoic acid, and directly alkylating the thiol in the reduction product.

4. An acid-addition compound of an alkyl thio-substituted benzoic acid ester of a dialkyl amino alkanol.

5. A hydrochloride of an alkyl thio-substituted benzoic acid ester of a dialkyl amino alkanol.

6. An organic compound having the formula $R'SC_6H_4COO(CH_2)_xNR''R'''$ where $x$ is an integer greater than unity and R', R'' and R''' represent alkyl radicals and in which the R'S group occupies the para position with respect to the ester group.

7. A compound as defined by claim 6, characterized by R', R'' and R''' representing the same alkyl radical.

8. A compound as defined by claim 6, characterized by R'' and R''' representing the same alkyl radical.

9. An alkyl thio-substituted benzoic acid ester of a dialkyl amino alkanol having the formula $R'SC_6H_4COO(CH_2)_xNR''R'''$, where $x$ is an integer greater than unity and R', R'' and R''' represent alkyl radicals.

SIDNEY E. HARRIS.
WILLIAM BRAKER.